Figure 1:
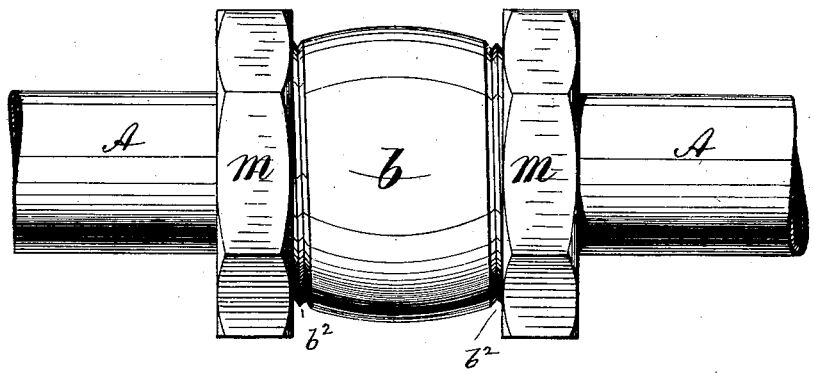

No. 733,995. PATENTED JULY 21, 1903.
A. PROFITLICH & H. GÜNSTER.
PIPE COUPLING.
APPLICATION FILED JAN. 20, 1903.
NO MODEL.

Witnesses:
Edward Ross
William Schulz

Inventors,
Alexander Profitlich &
Heinrich Günster
per Frank v. Briesen
Attorney.

THE NORRIS PETERS CO., PHOTO-LITHO., WASHINGTON, D. C.

No. 733,995. Patented July 21, 1903.

UNITED STATES PATENT OFFICE.

ALEXANDER PROFITLICH AND HEINRICH GÜNSTER, OF UNKEL-ON-THE-RHINE, GERMANY.

PIPE-COUPLING.

SPECIFICATION forming part of Letters Patent No. 733,995, dated July 21, 1903.

Application filed January 20, 1903. Serial No. 139,739. (No model.)

*To all whom it may concern:*

Be it known that we, ALEXANDER PROFITLICH and HEINRICH GÜNSTER, citizens of the German Empire, and residents of Unkel-on-the-Rhine, Germany, have invented certain new and useful Improvements in Coupling of Pipes, of which the following is a specification.

Our invention relates to a new pipe-coupling, as herein described; and the object of our invention is to provide an easy and simple way of joining pipes by the drawing together of a pair of nuts fitted on a split sleeve having threaded conical ends.

Figure 2:
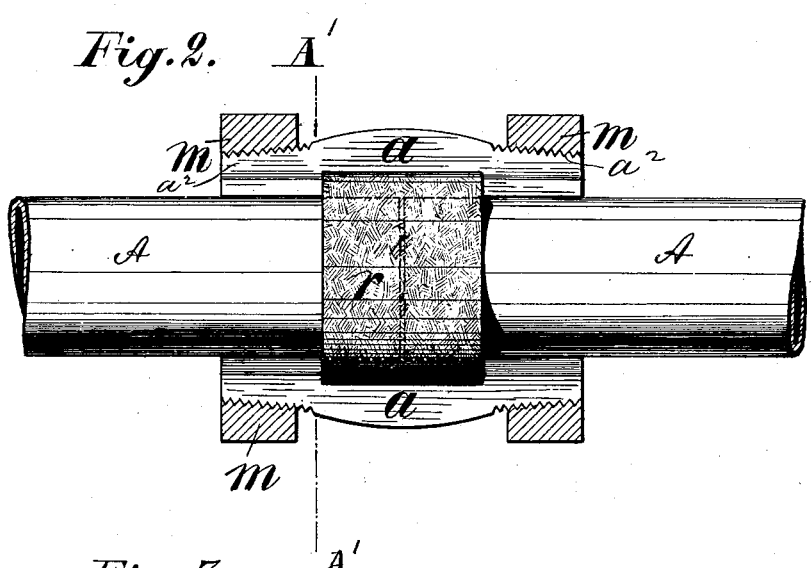

In the accompanying drawings, Figure 1 is a side view of our improved pipe-coupling; Fig. 2, a longitudinal central section, partly in elevation, thereof; and Fig. 3, a cross-section of line A' A', Fig. 2.

Figure 3:
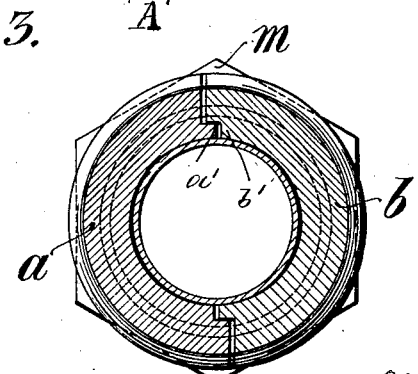

The coupling consists, essentially, of a longitudinally-split sleeve, the two halves $a$ $b$ of which are adapted to interlock, as at $a'$ $b'$, Fig. 3. The sleeve diminishes from its rounded central portion uniformly toward both ends, which are conical. These ends are threaded, as at $a^2$ $b^2$, for engagement with nuts $m$. On its inner face a circumferential groove or recess formed on the sleeve is adapted for the reception of a flexible packing-ring $r$.

In use the ends of the pipes A to be coupled are embraced by ring $r$, the divided sleeve is fitted over the same, and the nuts $m$ are screwed up to force the sleeve-sections together and compress the packing. Thus a perfectly tight joint is obtained.

What we claim as our invention, and desire to protect by Letters Patent, is—

A pipe-coupling composed of a divided recessed sleeve having coniform threaded ends, nuts engaging said ends, and a flexible packing engaging the recess, substantially as specified.

Signed by us at Dusseldorf, Germany, this 6th day of January, 1903.

ALEXANDER PROFITLICH.
HEINRICH GÜNSTER.

Witnesses:
WILLIAM ESSENWEIN,
PETER LIEBER.